United States Patent [19]

Mulder et al.

[11] Patent Number: 5,486,245

[45] Date of Patent: Jan. 23, 1996

[54] METHOD FOR RAISING WELDED RAIL CONNECTIONS LYING BELOW THE TRAVELING SURFACE ON RAILROAD TRACKS

[75] Inventors: Gerhardus J. Mulder, Essen; Frank Kuster, Ratingen, both of Germany

[73] Assignee: Elektro-Thermit GmbH, Essen, Germany

[21] Appl. No.: 257,613

[22] Filed: Jun. 9, 1994

[30] Foreign Application Priority Data

Jun. 11, 1993 [DE] Germany ............... 43 19 416.8

[51] Int. Cl.$^6$ ..................................... C21D 9/04
[52] U.S. Cl. ................................. 148/582; 148/581
[58] Field of Search ............................. 148/582, 581

[56] References Cited

U.S. PATENT DOCUMENTS 5,306,361  4/1994  Besch et al. ....................... 148/582

Primary Examiner—Deborah Yee
Attorney, Agent, or Firm—Anderson Kill Olick & Oshinsky

[57] ABSTRACT

Method for raising rail joint welds lying below the traveling surface on railroad tracks by heating the weld by means of an aluminothermic mixture which solidifies after reacting, wherein a) the aluminothermic mixture (21) is used in an amount measured in kilograms equalling from one fifth to one tenth of the weight per meter of the rail (15) measured in kilograms, wherein a1) 30 to 60% of this amount is used to heat the base (10) of the rail in a length of 150 to 300 mm (as measured symmetrically with reference to the weld in the longitudinal direction) and a2) the rest of the aluminothermic mixture (21) is used in equal proportions to heat both sides of the rail web (18), b) the aluminothermic mixture (21) is ignited, c) remains on the rail (15) after igniting for a period measured in minutes which corresponds to 0.7 to 1.5 times the number of kilograms of the aluminothermic mixture (21), whereupon d) the reacted and compacted mixture is removed from the base (10) and from the web (18) of the rail.

3 Claims, 2 Drawing Sheets

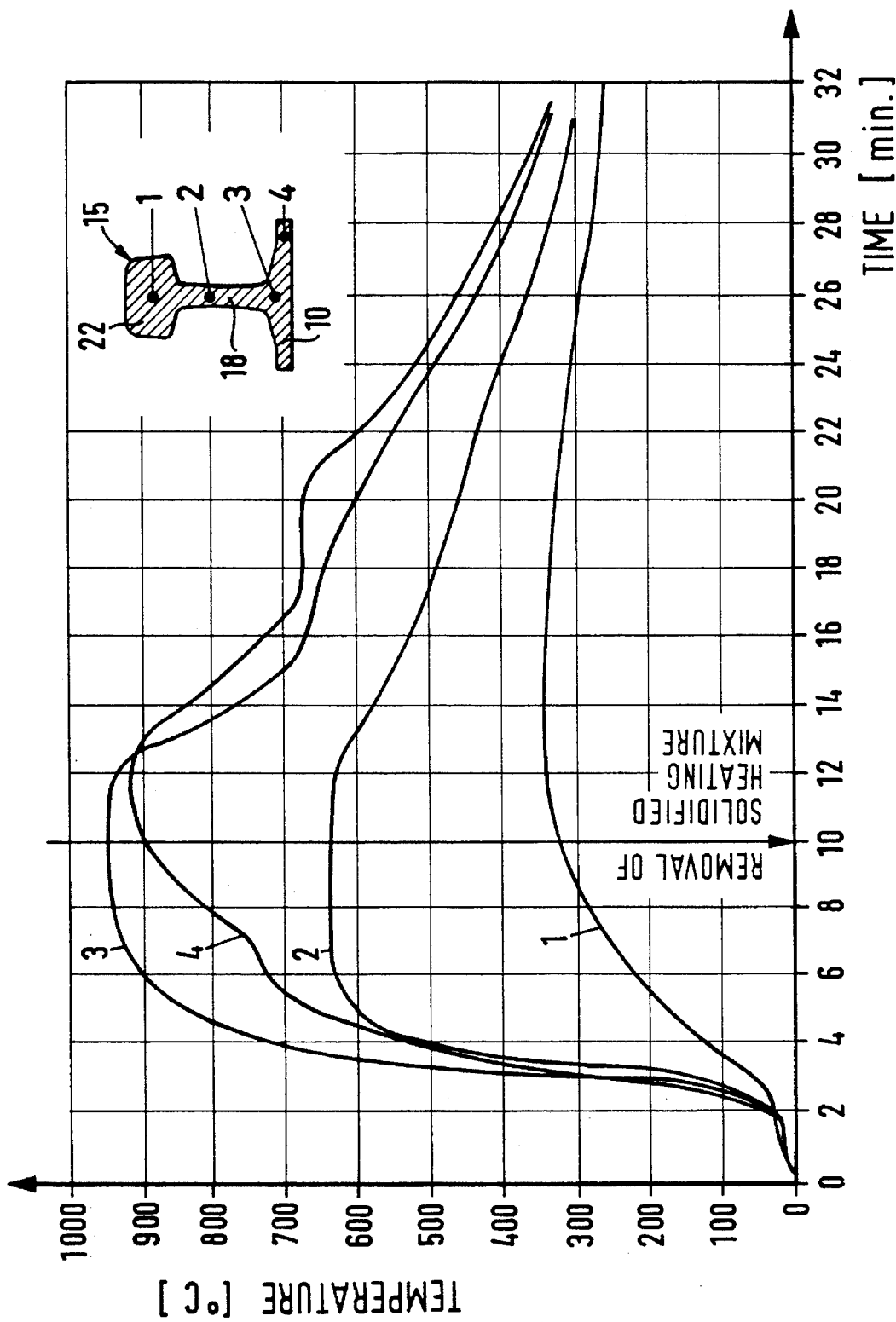

METHOD FOR RAISING WELDED RAIL CONNECTIONS LYING BELOW THE TRAVELING SURFACE ON RAILROAD TRACKS

FIELD OF THE INVENTION

The invention is directed to a method for raising rail joint welds lying below the traveling surface on railroad tracks by heating the weld by means of a thermite or aluminothermic mixture which solidifies after reacting.

BACKGROUND OF THE INVENTION

In railroad track networks, a level traveling surface is required to ensure a quiet or smooth running of the wheels. Thus, for example, after a weld is carried out, the polished or ground traveling surface is tested with a 1-meter straightedge of extremely precise manufacture and a feeler gauge. The 1-meter straightedge is set on the traveling surface so as to be centered on the weld. In so doing, a deviation of only +0.3 mm to −0.2 mm relative to the horizontal traveling surface of the rail is allowable at the traveling surface 50 cm to the right and left of the weld. These values should also be maintained under traffic.

However, it is inevitable that deviations from the ideal traveling surface will occur occasionally after welding or in the course of traveling over the track.

In this case, it is necessary to distinguish between a positive deviation and a negative deviation.

A positive deviation of the traveling surface is observed, for example, when joint welds have a higher resistance to wear than the rail. The buckling or bulge in the traveling surface occurring over the course of time as traffic passes over can sometimes be eliminated by regrinding true to profile.

More severe problems result in the case of negative deviations of the traveling surface. Ruts which can occur in the region of the weld due to reduced resistance to wear of the weld in comparison to the rail are particularly disadvantageous. A negative deviation can also be observed when the ends of the rail are inexpertly aligned prior to welding. As the weld cools to ambient temperature, it shrinks downward. This must be compensated for by a banking or excess elevation of the ends of the rail prior to the weld.

It is particularly important to eliminate such negative deviations of the traveling surface in the case of high-speed traffic. In this case, even small ruts lead to impact stress on the joint weld which reduces its useful life. The ballast under the ties adjacent to the weld is also affected. Apart from the reduced traveling comfort due to impact stress and noise when a train passes over a rutted weld, there is also the purely economic aspect of such a negative deviation in the traveling surface.

In most cases it is impossible to eliminate a selective worn down portion in the region of a weld joint by grinding, since the rut, as such, would remain and would only be enlarged in its longitudinal dimension.

SUMMARY OF THE INVENTION

The present invention is directed to the technical problem of vertical upward realignment of weld joints with a negative deviation from the traveling surface and restoring them to the ideal position by means of heat treatment. Once the horizontal configuration of the traveling surface has been restored, it remains maintained. This is true even in the case of reduced resistance to wear of the weld in comparison to the rail, since the rutted traveling surface of the weld is cold-deformed in a plastic manner and thus hardened under the impact stress of train traffic. Its behavior with respect to wear corresponds in general to that of the rail after the traveling surface has been made level.

It is already known to raise grooved rail joint welds or flat-bottomed rail joint welds by means of the application of heat. In so doing, it does not matter whether the joints have been produced by electric, aluminothermic or cut-off butt welding. Excessively low weld joints are raised, e.g. with gas-oxygen torches, by directing the flame particularly to the base of the rail. The partially heated base is accordingly deformed plastically and when the heat is removed and it has cooled to the ambient temperature the weld joint lifts up.

However, this method has grave disadvantages. It is basically carried out manually in the track. Consequently, results vary depending on the skill of the person carrying out the work. If the heat is applied too long, the weld is lifted too high necessitating an excessive and undesirable grinding of the bulge in the traveling surface. Apart from the lost time, the angular position of the ends of the rail base is undesirable. On the other hand, insufficient application of heat does not raise the weld far enough. It is very difficult to apply the correct amount of heat when working manually. When the heat is applied too quickly, there is even the danger that the austenitic rail base will cool too quickly, resulting in martensite formation which can lead to breakage. Excessive heating of the web of the rail is also disadvantageous, since cracks or breakage can occur therein due to an increase in internal stresses.

The present invention is concerned with the technical problem of leveling rail joint welds with negative deviation from the traveling surface by means of controlled heating of the weld joints. This leveling should be as free as possible from human factors and reproducible to a great extent.

Therefore, the subject matter of the invention is a method for raising rail joint welds lying below the traveling surface on railroad tracks by heating the weld with an aluminothermic mixture which solidifies after reacting, characterized in that:

a) the aluminothermic mixture is used in an amount measured in kilograms equalling from one fifth to one tenth of the weight per meter of the rail measured in kilograms, wherein:
  a1) 30 to 60% of this amount is used to heat the base of the rail in a length of 150 to 300 mm (as measured symmetrically with reference to the weld in the longitudinal direction) and
  a2) the rest of the aluminothermic mixture is used in equal amounts on both sides of the rail web for heating same, b) the aluminothermic mixture is ignited;

c) remains on the rail after igniting for a period measured in minutes which corresponds to 0.7 to 1.5 times the number of kilograms of the aluminothermic mixture; whereupon d) the reacted and solidified mixture is removed from the base and from the web of the rail.

BRIEF DESCRIPTION OF THE DRAWINGS

FIG. 2 is a temperature curve at measuring points 1 to 4.

DETAILED DESCRIPTION OF THE PREFERRED EMBODIMENTS

Figure 1:
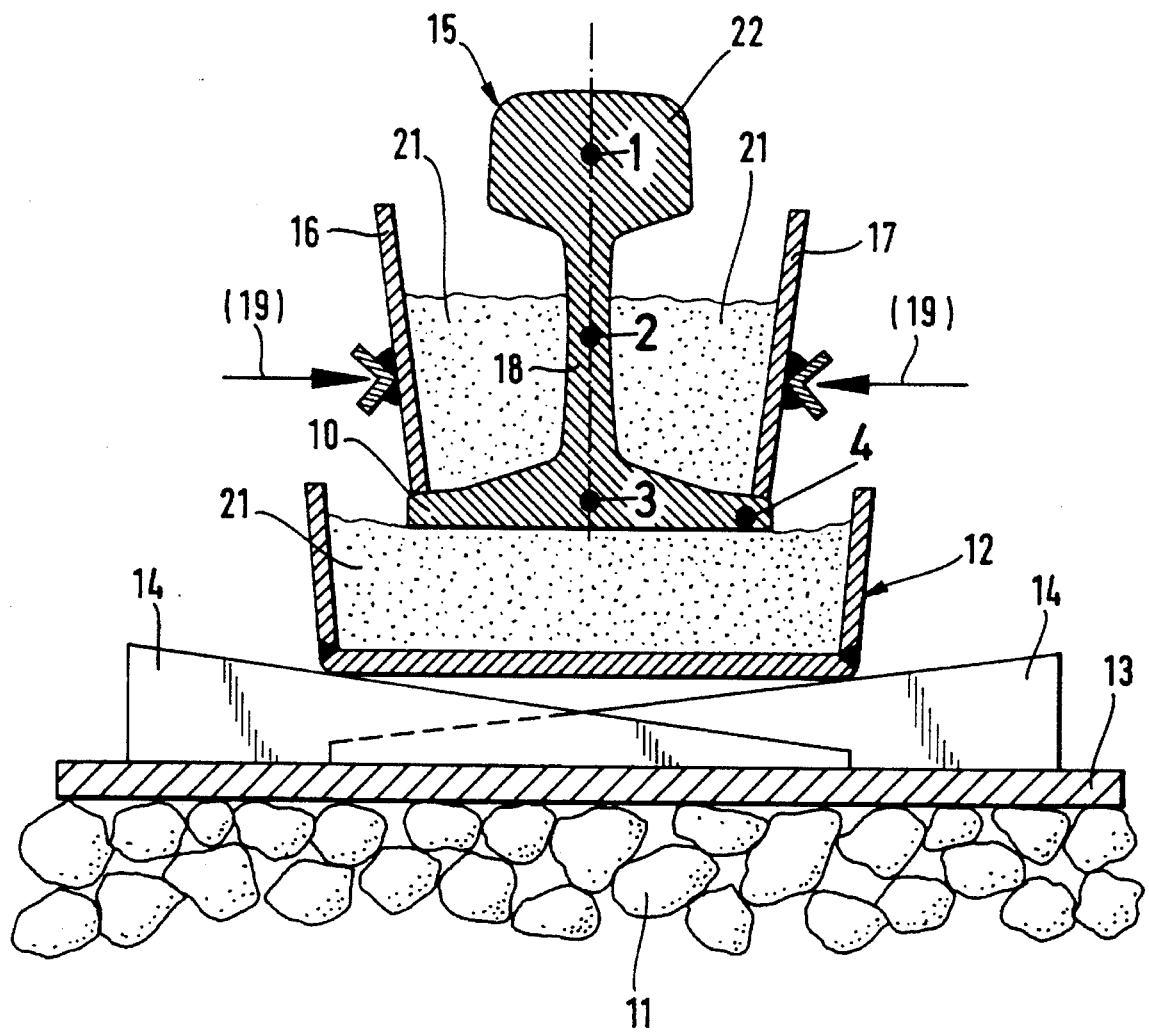
FIG. 1 illustrates a rail upon which the method of the present invention is applied.

Aluminothermic mixtures in powder form which form solid, cohesive reaction products in the course of and after the reaction are known from the prior art. These aluminothermic mixtures contain quartz sand, aluminum silicates or other moderating solids to dampen the reaction and to solidify the reaction products by sintering. Such mixtures can have the following composition:

30 to 40 percent by weight Al powder, particle size $\leq 1.5$ mm, 30 to 40 percent by weight $Fe_3O_4$ or $Fe_2O_3$ or mixtures of both oxides, particle size $\leq 3$ mm, 20 to 40 percent by weight quartz sand, particle size $\leq 2$ mm.

The proportioning rule pertaining to the weight of aluminothermic mixture used in relation to the weight per meter of the rail is particularly important. As measured in kilograms, the weight of aluminothermic mixture should equal one fifth to one tenth of the weight per meter of the rail measured in kilograms. The amount of heat released in the aluminothermic reaction and acting on the rail is accordingly fixed.

It is also important that 30 to 60% of this amount of aluminothermic mixture be arranged in the region of the base of the rail, specifically along a distance of 150 to 300 mm in the longitudinal direction of the weld symmetrically to the weld. The rest of the aluminothermic mixture is used to heat the web and is arranged in equal amounts on both sides of the web. By means of these two steps, the distribution of heat released in the reaction to the rail web and rail base is regulated.

In a preferred embodiment of the method according to the invention, a bottom box 12 having a length of 150 to 300 mm is arranged and secured under the rail base 10 and retaining plates 16, 17 are arranged and secured at both sides of the rail web 18. The required amount of powdered aluminothermic mixture 21 is placed in the bottom box 12 and in equal amounts between the rail web 18 and retaining plates 16, 17.

This variant of the method according to the invention is carried out as follows with reference to FIG. 1:

The rail base 10 is first exposed and, if necessary, ballast 11 is removed until the bottom box 12 can be arranged under the rail base 10 in the region of the joint weld symmetrically thereto. It is advisable to place a steel plate 13 on the ballast bed 11 and to clamp the bottom box 12 from below against the base 10 of the rail 15 (weld) by means of steel wedges 14 which are supported on the steel plate 13. The two retaining plates 16, 17 are secured relative to one another on both sides of the rail web 18 by clamps 19 made of spring steel. The bottom box 12 and the two retaining plates 16, 17 are sealed relative to the rail in a conventional manner, e.g. with adhesive sand.

This construction is supported in a simple and robust manner with respect to use under construction site conditions.

The partial amount of the aluminothermic weight to be used, 30 to 60% by weight of the total amount, is placed in the bottom box 12; the rest is placed in equal proportions between the retaining plates 16, 17 and the web 18. The three mixtures located in the receptacles are then reacted by an igniting rod. The aluminothermic reaction progresses slowly but steadily and is concluded in roughly 2 minutes. The resulting heat is transmitted to the weld joint, while the rail head 22 remains at a relatively low temperature, as desired, due to the arrangement. In contrast, the web 18 and base 10 undergo an increase in temperature in the austenite range.

FIG. 2 shows the temperature curve at four measuring points 1, 2, 3 and 4. It will be noted that the temperature hardly increases until the end of the reaction period of 2 minutes. At this point, however, the web 18 and base 10 heat up quite quickly. The web 18 remains at constant temperature after approximately 6 minutes, while the temperature at the outside of the base (measurement point 4) continues to increase. This temperature difference is required for raising the weld joint during the cooling to ambient temperature and is a result of the quantity and arrangement, according to the invention, of the aluminothermic mixture 21.

The sintered blocks formed by the reaction are removed from the heated weld after a period of time measured in minutes corresponding to 0.7 to 1.5 times the numerical value of the weight of the aluminothermic mixture measured in kilograms. In principle, the desired extent of vertical adjustment is best achieved when a great amount of heat is supplied on the one hand and the temperature difference from the head 22 to the base 10 is as great as possible on the other hand. In the temperature curve shown in FIG. 2, this time is most pronounced ten minutes after the reaction is initiated. The example relates to a 132-RE rail (USA) with a weight per meter of approximately 66 kg.

In another preferred embodiment form of the method according to the invention, the aluminothermic mixture 21 is used in the form of pre-formed and compacted solid bodies which are arranged and secured under the base of the rail and on both sides of the web, respectively. The solid bodies contain the aluminothermic reaction mixture in the required amounts and are adapted in shape to the base and web of the rail.

Such solid bodies can be produced, in a manner known per se, in that the aluminothermic, sand-filled mixtures are saturated with liquid glass solution and solidified after application of $CO_2$. The obtained blocks which are adapted in shape to the base and web of the rail can now be secured, e.g. by clamps, directly on the rail without special form boxes or retaining plates. The solid bodies also retain their solidity and shape during and after the reaction. They are removed from the rail 15 after the reaction at the expiration of the time period indicated in feature c). Naturally, it is also possible to use additional form plates to protect the ballast bed 11 or to improve fastening. These additional form plates can then be constructed in a suitable thinness.

Experience has shown that the desired degree of vertical adjustment of low weld joints is usually 1.5 to 2.0 mm. The weld then almost always comes above the horizontal reference or zero line on the one hand and, on the other hand, the necessary grinding of the traveling surface when cooled to the ambient temperature is not too costly and the relative position of the rail bases is not too angular. As soon as the weld has cooled to ambient temperature, a so-called finish grinding is carried out, whereupon the testing procedure mentioned above is implemented with the 1-meter straight-edge and feeler gauge.

A particular advantage of the method according to the invention consists in that the weld in the base and web is standardized. This is manifested in the strength and deformation values. An example of a typical test on rail joint welds is the so-called transverse rupture test or bending-at-rupture test in which the weld rests centrally on two supports separated by a distance of 1 meter and is loaded by a press until rupture. In comparison to a rail receiving heat treatment according to the prior art, the standardization process brings about a 10% to 15% increase in the load at rupture and a 90% to 100% increase in the measured deflection at rupture.

What is claimed as new and desired to be protected by Letters Patent is set forth in the appended claims.

What is claimed is:

1. Method of raising of rail joint welds which lie below a traveling surface of railroad tracks, by heating a weld with an ignited aluminothermic mixture which solidifies after reacting, said method comprising the steps of:

providing the aluminothermic mixture in an amount that, measured in kilograms, is equal to from one-fifth to one-tenth of the weight per meter of the rail, likewise measured in kilogram;

distributing the aluminothermic mixture so that a rail base is heated by using 30 to 60% of the aluminothermic mixture, and a rail web is heated by using a remaining amount of the aluminothermic mixture evenly distributed on both sides of the rail web;

igniting the aluminothermic mixture and leaving the aluminothermic mixture on the rail for a number of minutes equal to 0.7 to 1.5 times the weight in kilograms of the amount of aluminothermic mixture, whereby, due to a pattern of distribution of the aluminothermic mixture along the rail base and the rail web, the rail base and the rail web are heated to different temperatures resulting in raising of the weld; and removing the reacted aluminothermic mixture from the rail base and web.

2. Method according to claim 1, further comprising:

arranging and securing a bottom box (12) having a length of 150 to 300 mm under the rail base (10);

arranging and securing retaining plates (16, 17) at both sides of the rail web (18); and placing the required amount of aluminothermic mixture (21) in the bottom box (12) and in equal proportions between the rail web (18) and retaining plates (16, 17).

3. Method according to claim 1, further comprising:

using the aluminothermic mixture (21) in the required amounts in the form of pre-formed and compacted solid bodies;

arranging and securing the mixture under the base (10) of the rail and on both sides of the web (18), respectively; and adapting the solid bodies containing the aluminothermic reaction mixture (21) to the shape of the base (10) and web (18) of the rail.

* * * * *